United States Patent [19]

Sung

[11] Patent Number: 5,008,762
[45] Date of Patent: Apr. 16, 1991

[54] PARALLEL AND CONTINUOUS PLAYBACK CIRCUIT FOR AN AUDIO CASSETTE DECK OF THE DOUBLE-DECK TYPE

[75] Inventor: Song G. Sung, Seoul, Rep. of Korea

[73] Assignee: SamSung Electronics Co., Ltd., Kyung Ki-Do, Rep. of Korea

[21] Appl. No.: 377,084

[22] Filed: Jul. 10, 1989

[51] Int. Cl.$^5$ .................. G11B 15/12; G11B 15/18
[52] U.S. Cl. ........................... 360/61; 360/63; 360/69
[58] Field of Search ............. 360/61, 63, 78.03, 72.1, 360/69; 361/130

[56] References Cited

U.S. PATENT DOCUMENTS

| | | | |
|---|---|---|---|
| 4,179,715 | 12/1979 | MacDonough | 360/61 |
| 4,636,878 | 1/1987 | Murayama | 360/72.1 |
| 4,644,423 | 2/1987 | Buntsis et al. | 360/61 |
| 4,758,908 | 7/1988 | James | 360/61 |
| 4,809,093 | 2/1989 | Hamabe et al. | 360/61 |

*Primary Examiner*—A. D. Pellinen
*Assistant Examiner*—Richard T. Elms
*Attorney, Agent, or Firm*—Robert E. Bushnell

[57] ABSTRACT

A parallel and continuous playback circuit for an audio cassette deck of the double-deck type (A-deck and B-deck) includes signal detectors for detecting the tape signal of the playback head of each deck during playback, pulse generators for generating arbitrary pulses when an unrecorded blank portion is detected by the signal detectors, a deck selector for selecting the playback mode of the A-deck or the B-deck in parallel, i.e. alternately, upon detection of an unrecorded portion on the tape being played back in the other deck and for pausing playback of the tape in the deck in which the unrecorded portion is detected, and an error prevention circuit for preventing erroneous operation of the deck selector after selection of the other deck and upon encountering and unrecorded portion such as as the start of the tape in the selected deck. The playback circuit offers the advantage of playing back of the tape cassette in the other deck when an unrecorded portion is detected on the tape cassette in the deck currently being played back, thus alternating playback between the A-deck and B-deck in distinction to double cassette decks of the serial play or relay play type which play back the entire cassette in one deck before changing playback to the cassette in the other deck, and so on. The parallel and continuous playback circuit thus alleviates the tedium of listening to unrecorded blank portions of the cassettes by switching playback to the other deck of the double-deck.

6 Claims, 1 Drawing Sheet

DECK "A"   DECK "B"

DECK "A"   DECK "B"

PARALLEL AND CONTINUOUS PLAYBACK CIRCUIT FOR AN AUDIO CASSETTE DECK OF THE DOUBLE-DECK TYPE

BACKGROUND OF THE INVENTION

The present invention relates to a parallel-continuous playback circuit for audio cassette decks of the double-deck type, particularly to a circuit which can pause the A-deck for a moment if a blank (unrecorded) part is detected on playing back a tape in the A-deck, and play back a tape in the B-deck at the same time, so that the tapes in the A-deck and B-deck can be played back in parallel.

In the past, a conventional cassette deck of the double-deck type first completed the playback of the tape in the A-deck, and next played back the tape in the B-deck (e.g., serial or relay playback).

Thus, for example, when a conversation tape is inserted in the A-deck and a music tape is inserted in the B-deck, and the power supply is turned on, then the conversation tape is continuously played back, thereby causing the user tedium.

SUMMARY OF THE INVENTION

The present invention has for its object to provide a parallel playback circuit for an audio cassette deck of the double-deck type in which, if an unrecorded part is detected on playing the tape in a cassette in the A-deck, a tape in the B-deck is automatically played, and if an unrecorded part between the recorded portions of the tape in the B-deck is again detected, then the playback is again changed to the A-deck.

According to the present invention, there is provided a parallel and continuous playback circuit for an audio cassette deck of the double-deck type comprising: a control means for causing pulse generators to produce an arbitrary pulse when a recorded portion of a tape is played back and detected in the A and B-decks, a selection means for selecting the play mode or the stop mode of the A-deck and the B-deck by logical processing of the generated pulse signals of the control means, and a parallel playback means for preventing incorrect operation of the selection means in order to play the tapes in a cassette deck of the double-deck type in parallel.

DETAILED DESCRIPTION OF THE INVENTION

The present invention will be now described in more detail with reference to the accompanying drawings.

Figure 3:
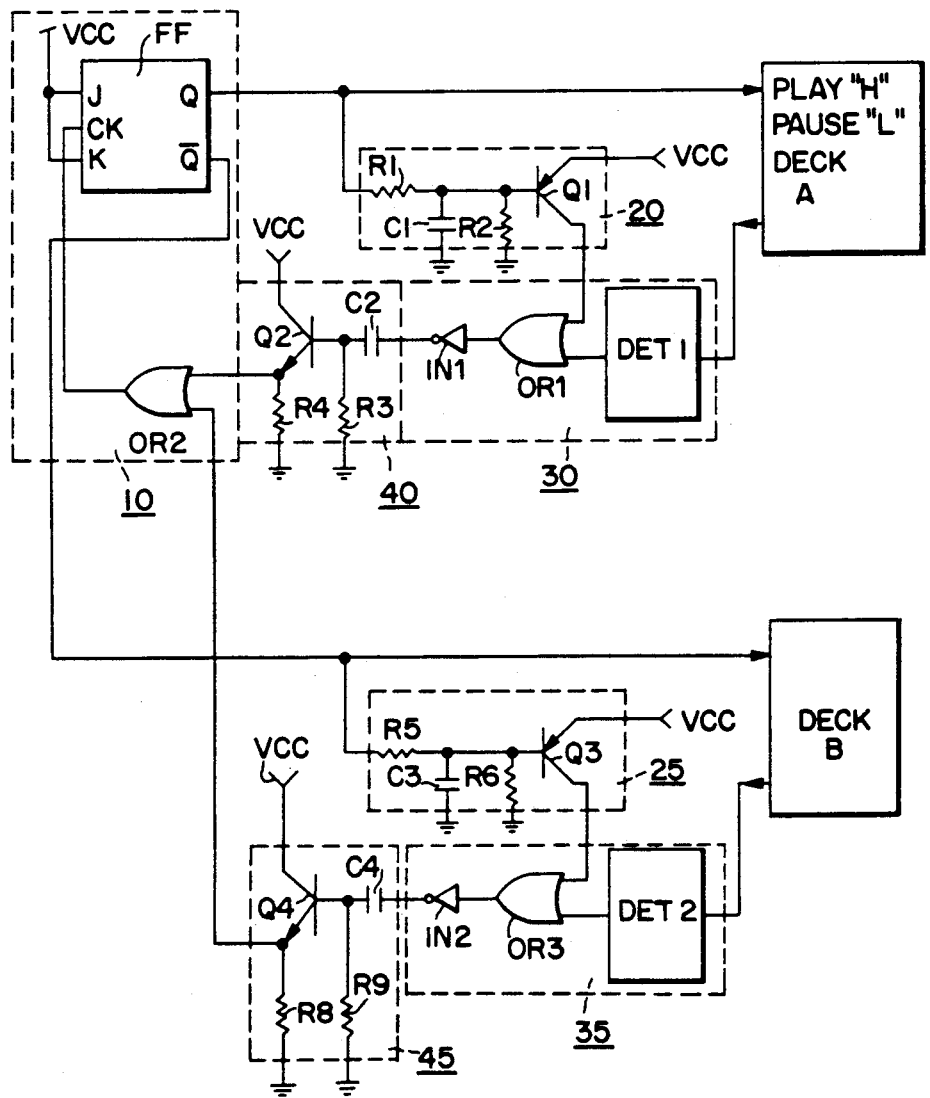
FIG. 3 is a circuit diagram of the present invention.

As shown in FIG. 3, the present invention is composed of the signal detectors 30 and 35 to detect the unrecorded part between the recordings on a tape by detecting the tape signal of the tape playback in the audio head, the pulse generators 40 and 45 to produce an arbitrary pulse when an unrecorded part is detected by signal detectors 30 and 35, the deck selector 10 to select the A and B-decks in parallel in response to the output pulses of the pulse generators 40 and 45, and the error-prevention parts 20 and 25 to prevent incorrect operation of the parallel control between the unrecorded parts in playback-mode.

Figure 1:
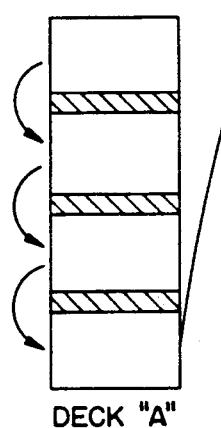
FIG. 1 is a diagram showing the conventional serial playback of tapes in a double-deck type cassette deck.
Figure 2:
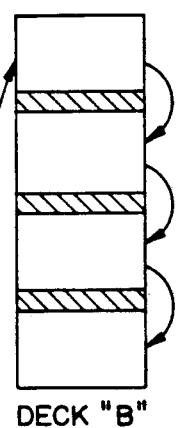
FIG. 2 is a diagram of the present invention for parallel playback of tapes in a double-deck cassette deck.

As shown in FIG. 2, when the recording 1 is reproduced in the playback mode of the A-deck, when an unrecorded part is detected, then the A-deck goes to the pause mode and the playback mode is transferred from the A-deck to the B-deck, playing back the recording 5 of the tape in the B-deck.

When an unrecorded part is next detected in the B-deck, the playback mode is transferred to the A-deck, and the B-deck enters the pause-mode, and then the recording 2 in the A-deck is played back.

To explain the operation of the present invention in detail, first, turning the power supply on, the outputs Q and $\overline{Q}$ of the J/K flip-flop in the deck selector 10 become HIGH and LOW-level, respectively, so that the A-deck enters the playback mode, but the B-deck enters the pause mode.

When the tape in the A-deck is played in the playback mode, the signal detector DET 1 of the signal detection part 30 provides a HIGH-level output, and it is inverted through the OR gate OR1 and inverter IN1, and the inverted signal is applied to the pulse generation part 40.

On the other hand, the signal detector DET 2 of the B-deck in the pause-mode provides a LOW-level output to the OR gate OR3 and another input of the OR gate OR3 is connected to the supply voltage Vcc through the transistor Q3 of the error prevention part 25, so the output of the OR gate OR3 becomes HIGH-level, then the signal applied to the pulse generation part 45 through the inverter IN2 is LOW-level.

Thus, because of the LOW-level signal outputs of both pulse generation parts 40 and 45, in the same initial state, a LOW signal from OR gate OR2 is applied to the clock terminal CK of the J/K flip-flop so that the A-deck is maintained in the playback mode, and the B-deck in the pause mode.

If an unrecorded blank tape part is scanned on playing the tape in the A-deck in playback mode, then the signal detector DET 1 of the signal detection part 30 provides a LOW-level signal and a HIGH-level signal is applied to the pulse generation part 40 through the inverter IN1.

As the pulse generation part 40 provides a HIGH-level output signal, the output of gate OR2 goes to HIGH-level, thereby providing an edge signal of a rising pulse to the clock terminal CK of the J/K flip-flop, then the outputs Q and $\overline{Q}$ of the J/K flip-flop become LOW and HIGH-level, respectively, so that the A-deck is changed to the pause-mode, while the B-deck is changed to the playback mode.

On the other hand, the HIGH signal of the output terminal $\overline{Q}$ of the J/K flip-flop is applied to the error-prevention part 25, then the transistor Q3 is turned on during the time capacitor C3 is being charged to the HIGH-level.

And, the supply voltage Vcc is provided to a terminal of the OR gate OR3 so that the pulse generation part 45 does not provide a HIGH-level signal even if the B-deck starts to playback an unrecorded part between the recordings on the B-deck tape and the output of the signal detector DET 2 is LOW-level.

That is, when the A-deck is changed to the PAUSE-mode upon detecting an unrecorded part on playing back the tape in the A-deck, and the B-deck goes to the playback mode, the PAUSE phenomenon of the B-deck occurring due to no detection of the tape signal at the tape's start point or an unrecorded part of the tape can be prevented as mentioned before.

Therefore, from the time that the capacitor C3 is fully charged, that is, when the transistor Q3 turns off, the B-deck begins to play the recording regardless of the lack of the B-deck tape signal.

And, if an unrecorded blank part between the recorded portions is again detected on the B-deck tape, then the output of DET 2 becomes LOW-level, and the transistor Q3 is already turned off, so that the output of the OR gate OR3 becomes LOW-level.

The output of the OR gate OR3, being LOW-level, is inverted by the inverter IN2 and is provided to the pulse generation part 45, and the pulse output through the transistor Q4 is applied to the OR gate OR2 of the deck selection part 10, so that the outputs Q and $\bar{Q}$ of the J/K flip-flop again become HIGH-level and LOW-level, respectively, and the A-deck goes into the playback-mode and the B-deck changes to the PAUSE-mode, in similar manner as mentioned above, thereby playing the tapes in both decks of the double deck in parallel.

As mentioned above, the present invention has the effect that the tapes in both decks of the double deck can be played in parallel, so that the user can listen to the voice signal of the other tape in the B-deck in turns when an unrecorded blank part is detected on listening to the audio sound of the tape in the A-deck.

The invention is in no way limited to the embodiment described hereinabove. Various modifications of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A parallel and continuous playback circuit for an audio cassette deck of the double-deck type having a first and second deck with each deck having a playback head and a playback mode and a pause mode, comprising:
    signal detection means for detecting the signal from the playback head of each of said first deck and said second deck and for detecting the playback of an unrecorded blank portion of a tape in the first deck and in the second deck;
    pulse generator means operably connected with said signal detection means, for generating an arbitrary pulse signal in response to the detection by said signal detection means of the playback of an unrecorded blank portion of a tape in any one of the first deck and the second deck, said pulse signal identifying in which of said first and second decks said unrecorded blank tape portion is being played back; and
    deck selector means operably connected with said pulse generator means and responsive to said pulse signal therefrom, for putting the one, of said first and second decks in which it is detected by said signal detection means that the unrecorded blank tape portion is being played back, into its said pause mode and for putting the other of said first and second decks into its said playback mode.

2. A parallel and continuous playback circuit for an audio cassette deck of the double-deck type according to claim 1, further comprising:
    error prevention means for preventing erroneous operation of said deck selector means upon the detection by said signal detection means of an unrecorded blank tape portion on the tape in the other of said first and second decks put into its playback mode by operation of said deck selector means.

3. A parallel and continuous playback circuit for an audio cassette deck of the double-deck type according to claim 1, wherein said signal detection means comprises:
    first and second signal detectors respectively operably connected with the playback heads of said first and second decks and each generating a HIGH-level signal output upon detection of the playback of a recorded portion of a tape;
    first and second OR gates each having a first input respectively operably connected with a respective output of one of said first and second signal detectors; and
    first and second inverters respectively operably connected with a respective output of one of said first and second OR gates.

4. A parallel and continuous playback circuit for an audio cassette deck of the double-deck type according to claim 3, wherein said pulse generator means comprises:
    first and second pulse generation circuits respectively operably connected with an output of a respective one of said first and second inverters and each responsive to a HIGH-level signal from said respective inverter and in response thereto generating a HIGH-level pulse.

5. A parallel and continuous playback circuit for an audio cassette deck of the double-deck type according to claim 4, wherein said deck selector means comprises:
    a third OR gate having a first input operably connected to an output of said first pulse generation circuit and a second input operably connected to an output of said second pulse generation circuit; and
    a J/K flip-flop having its clock input terminal operably connected with an output of said third OR gate, its J and K inputs tied to a HIGH-level voltage, and its Q and $\bar{Q}$ outputs respectively operably connected to respective mode control inputs of said first and second decks.

6. A parallel and continuous playback circuit for an audio cassette deck of the double-deck type according to claim 5, wherein said error prevention means comprises:
    first and second transistor having their bases respectively operably connected to the Q and $\bar{Q}$ outputs of said J-K flip-flop, respectively, their emitters tied to a HIGH-level voltage, and their collectors respectively operably connected to respective second inputs of said first and second OR gates; and
    first and second capacitors respectively operably connected between the respective bases of said first and second transistors and voltage ground.

* * * * *